(12) United States Patent
Schneider et al.

(10) Patent No.: US 8,645,039 B2
(45) Date of Patent: Feb. 4, 2014

(54) MULTI-CIRCUIT ELECTROHYDRAULIC MOTOR VEHICLE BRAKE SYSTEM AND METHOD FOR OPERATING THE SAME

(75) Inventors: Heinz-Anton Schneider, Niedernhausen (DE); Bernhard Schmittner, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 218 days.

(21) Appl. No.: 12/989,188

(22) PCT Filed: Apr. 23, 2009

(86) PCT No.: PCT/EP2009/054901
§ 371 (c)(1),
(2), (4) Date: Jan. 17, 2011

(87) PCT Pub. No.: WO2009/130283
PCT Pub. Date: Oct. 29, 2009

(65) Prior Publication Data
US 2011/0144878 A1 Jun. 16, 2011

(30) Foreign Application Priority Data

Apr. 24, 2008 (DE) .......................... 10 2008 020 717
Apr. 7, 2009 (DE) .......................... 10 2009 016 638

(51) Int. Cl.
*B60T 13/00* (2006.01)
*G06F 7/70* (2006.01)

(52) U.S. Cl.
CPC .. *B60T 13/00* (2013.01); *G06F 7/70* (2013.01)
USPC ................................ 701/70; 303/13; 188/156

(58) Field of Classification Search
USPC ..................... 701/70; 188/156, 158; 303/3, 15
See application file for complete search history.

(56) References Cited

U.S. PATENT DOCUMENTS

| 6,019,436 | A | * | 2/2000 | Siepker | ........................... 303/13 |
| 6,209,689 | B1 | | 4/2001 | Boehm | |
| 6,582,030 | B2 | | 6/2003 | Harris | |
| 6,663,195 | B1 | * | 12/2003 | Arnold | ..................... 303/122.03 |

(Continued)

FOREIGN PATENT DOCUMENTS

| DE | 600 03 310 | 11/2000 |
| DE | 100 33 835 | 1/2002 |

(Continued)

OTHER PUBLICATIONS

International Search Report for PCT/EP2009/054901 issued Aug. 30, 2010.

(Continued)

*Primary Examiner* — Thomas Tarcza
*Assistant Examiner* — Tyler J Lee
(74) *Attorney, Agent, or Firm* — RatnerPrestia

(57) ABSTRACT

A multi-circuit electrohydraulic motor vehicle brake system includes a plurality of calipers having hydraulically actuated actuators which are hydraulically connected to an electronically controlled unit. The unit includes an electronic unit ECU and a hydraulic unit HCU. At least some of the calipers, additionally or separately include electromechanical actuators for actuating or releasing a parking brake effect. In order to cut down on electrical interfaces and electronic units in a motor vehicle, the electronic unit is connected to the electromechanical actuators via respective two separate electrical supply lines, and the electronic unit has at least one electrical switch for supplying the electromechanically actuated actuators with power.

16 Claims, 2 Drawing Sheets

(56) References Cited

U.S. PATENT DOCUMENTS

| | | | | |
|---|---|---|---|---|
| 6,728,614 | B2* | 4/2004 | Matsubara et al. | 701/36 |
| 6,848,545 | B2* | 2/2005 | Scheuring et al. | 188/2 D |
| 7,121,633 | B2* | 10/2006 | Tachiiri et al. | 303/20 |
| 7,819,210 | B2* | 10/2010 | Tonoli et al. | 180/65.21 |
| 7,837,278 | B2* | 11/2010 | Nilsson | 303/20 |
| 7,925,408 | B2* | 4/2011 | Shiraki | 701/70 |
| 2005/0127749 | A1 | 6/2005 | Hartmann et al. | |
| 2010/0299018 | A1* | 11/2010 | Lohberg et al. | 701/29 |
| 2010/0299035 | A1* | 11/2010 | Maron et al. | 701/70 |
| 2011/0042171 | A1* | 2/2011 | Knechtges | 188/106 F |

FOREIGN PATENT DOCUMENTS

| | | |
|---|---|---|
| DE | 103 49 970 | 6/2005 |
| EP | 1 767 806 | 3/2007 |
| WO | WO 99/26829 | 6/1999 |

OTHER PUBLICATIONS

German Search Report for DE 10 2009 016 638.6 dated Aug. 13, 2009.

* cited by examiner

MULTI-CIRCUIT ELECTROHYDRAULIC MOTOR VEHICLE BRAKE SYSTEM AND METHOD FOR OPERATING THE SAME

CROSS REFERENCE TO RELATED APPLICATIONS

This application is the U.S. national phase application of PCT International Application No. PCT/EP2009/054901, filed Apr. 23, 2009, which claims priority to German Patent Application No. DE 10 2008 020 717.9, filed Apr. 24, 2008, and German Patent Application No. DE 10 2009 016 638.6, filed Apr. 7, 2009, the contents of such applications being incorporated herein by reference.

FIELD OF THE INVENTION

The invention relates to a multi-circuit electrohydraulic motor vehicle brake system comprising a plurality of brake calipers with hydraulically operable actuators which are organized in a plurality of hydraulic brake circuits and are hydraulically connected to an electronically controlled unit comprising an electronics unit and a hydraulics unit having a motor pump unit for the hydraulic supply of power, and wherein the hydraulically operable actuators can either be operated by hydraulic operating means under the initiation of a driver, and/or can be operated by the hydraulics unit independently of the driver, particularly by an electronic stability program (ESC), and wherein at least some of the brake calipers, particularly for the purposes of operating or releasing a parking brake effect, additionally or separately have electromechanical actuators, wherein at least one electrical current source is electrically connected to the electronics unit, which is used for supplying electricity to the motor pump unit.

BACKGROUND OF THE INVENTION

An already mass-produced, previously known, brake system with electromechanical actuators is provided not only with the electronic stability program—and with the associated ESC controller (ESC-ECU)—but also with separate EPB control electronics (EPB-ECU) for supplying current to and controlling the electromechanical actuators. The EPB control electronics are positioned separately in a housing at a separate location in the motor vehicle. Each of the two control electronics is connected to an electrical current source. For communication, a network topology interconnection (usually a CAN bus system) is used which has the ESC-ECU incorporated into it. In addition, there are a plurality of electrical connecting or supply lines between the EPB control electronics and the electromechanical actuators. For driver-initiated operation, a man-machine interface is used which is connected to the EPB-ECU.

Operation is usually such that the EPB controller reads in a parking brake operation request and supplies current to the electromechanical actuators (EPB actuators)—which are usually in the form of reversible electric drive motors—independently of one another on the basis of the driver's request, that is to say either operates or releases them for a parking brake effect.

The known brake system results in a high level of complexity both for a brake system manufacturer and for a motor vehicle manufacturer. The reason for this is particularly that the separate hardware needs to be manufactured, assembled and finally installed in a motor vehicle. This results in significant wiring complexity for the vehicle manufacturer.

SUMMARY OF THE INVENTION

It is an object of at least one aspect of the present invention to reduce the complexity for an electromechanical parking brake function and at the same time to allow reliable actuation of the electromechanical actuators.

In principle, the invention involves streamlining the separate EPB electronics unit by virtue of an ESC electronics unit, which is present anyway, being connected to the electromechanical actuators by means of at least two respective separate electrical supply lines, and by virtue of said ESC electronics unit having at least one electronic switching means in order to supply electricity to the electromechanically operable actuators. The invention reduces the overall complexity for manufacturing the brake system, and reduces the wiring complexity. A particular advantage of the invention is attained particularly in cases in which the electrical current source provides a comparatively low voltage, in which case the streamlining of a separate EPB controller helps to produce the advantageous effects.

In developments of the invention, provision is also made for electromechanical actuators having an extremely high level of efficiency to be used, so that they too require comparatively little current for achieving the required tensioning forces.

Advantageously, the improved, inventive cost structure of the invention even allows the proposed brake system to be used in the small car class or in motor vehicles in a lower mid-range class.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 2:
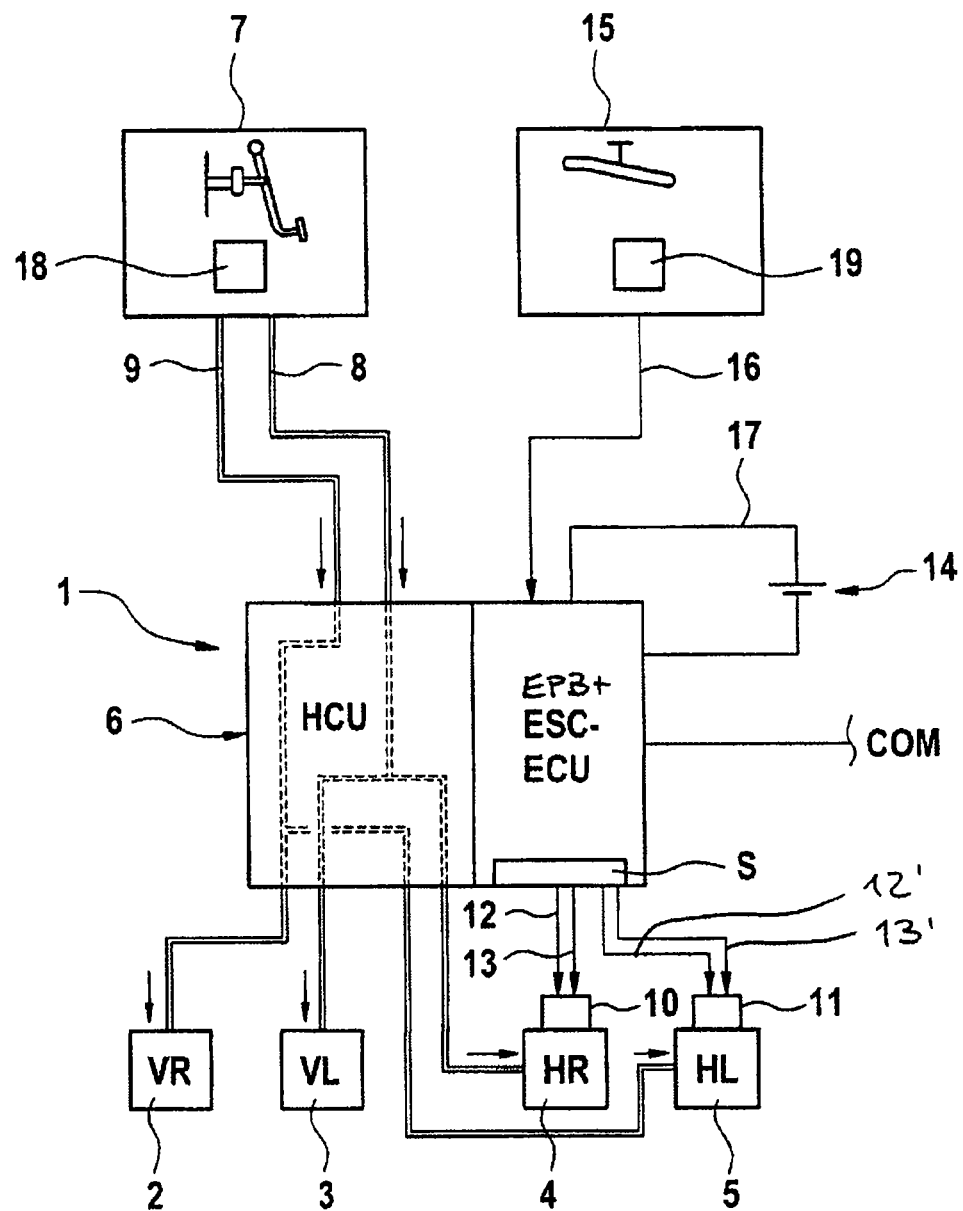
FIG. 2 shows a brake system according to aspects of the invention.

FIG. 2 reveals a multi-circuit, electrohydraulically operable motor vehicle brake system 1. This comprises a plurality of brake calipers 2-5 with hydraulically operable actuators which are organized in a plurality of hydraulic brake circuits and are hydraulically connected to an electronically controlled unit 6 comprising an electronics unit (EPB+ESC-ECU) and a hydraulics unit (HCU) containing a motor pump unit and also electrohydraulic valves for the hydraulic supply of power. In this case, the hydraulically operable actuators can be operated by a hydraulic operating means 7 via continuous hydraulic lines 8, 9 under the initiation of a driver, and the unit 6 fundamentally provides an electronically controlled brakeforce distribution system (EBD) for the brake calipers 2-5 in this connection. A further function is that the brake calipers 2-5 can be operated independently of the driver by the unit 6, particularly by an electronic stability program (ESC). In order to allow a further electronic assistance function, at least some of the brake calipers 2-5 additionally or separately have electromechanical actuators 10, 11 with a high level of efficiency, particularly for the purposes of operating or releasing a parking brake effect on the basis of a parking brake request. The electromechanical actuators 10, 11 may be provided in connection with a disk brake, or may act on a drum brake, these respectively being arranged preferably on a rear axle. The invention can also be applied to other friction or latch mechanisms which are used for locking vehicle wheels. For the purpose of supplying electricity, at least one electrical current source 14 is electrically connected to the electronics unit ECU. The same connection is used for the fundamental supply of electricity to the unit 6 and the loads connected thereto. The electronics unit EPB+ESC-ECU is connected to the electromechanical actuators 10, 11 by means of at least two respective separate electrical supply lines 12, 13. In addition, the electronics unit EPB+ESC-ECU has at least one electrical switching means for the purpose of supplying current in an electrically reversible fashion to the electromechanically operable actuators 10, 11. It is self-evident that the use of three-phase drives in the region of the actuators 10, 11 may involve the provision of three supply lines without departing from the core of the invention.

Said switching means may additionally have integrated means for reversing at least one of the electromechanical actuators 10, 11 in order to release an operated parking brake function. The specific refinement of such reversing means may be in different forms. When a DC drive motor is used in the region of the actuators 10, 11, semiconductor switches acting in the manner of a relay may be sufficient for simply commutating the current in the two supply lines 12, 13. Particularly when multiphase, in particular brushless, DC motors are used, it is, by contrast, preferable to integrate switching means which contains semiconductor switching means in what is known as a MOSFET H bridge circuit arrangement in order to allow multiquadrant operation.

In order to connect the electronics unit EPB+ESC-ECU to its peripherals, such as particularly the actuators 10, 12, at least one additional electrical interface S is used, for example with at least one additional electrical plug-in element, for the electrical connection to the at least two electrical supply lines 12, 13; 12', 13'. A bus connection COM is provided for the purpose of integration and communication of the ESC+EPB–ECU within a vehicle network topology. Further ports or connections of operating sensors 18, 19, wheel rotation sensors, pressure sensors or the like are not clarified.

In a further preferred refinement of the invention, a man-machine interface 15 in the form of a switch or pushbutton switch and switching means—not explicitly shown—integrated in the ECU are connected in series with the actuators 10, 11. For the electrical connection, an electrical connecting line 16 is used between the man-machine interface 15 and the ECU.

Although it is not evident in detail in this form from the schematic FIG. 2, it is advantageous in the case of one advantageous embodiment for minimizing line lengths and resultant electrical line resistances if the electronics unit EPB+ESC–ECU and the current source 14 are arranged relatively close to one another in a common installation space, such as particularly in an engine compartment or trunk of a motor vehicle, so that the connection 17 can be kept relatively short. Considered overall, the fundamental guideline used for proportioning all the electrical line lengths in the system may be that a quotient for the length of a longest supply line 12, 13, on the one hand, and the length of an electrical connection 17 between the electrical current source 14 and the electronics unit EPB+ESC-ECU, on the other hand, is at least approximately two or more. With particular preference, a quotient of between approximately 3 and 10 is sought, with a short single wire length also being sought, in principle, in order to fundamentally reduce electrical resistances. The terms line length or wire length are generally defined such that they can be understood, in principle, to mean current-carrying components such as particularly what are known as busbars or else other fixed vehicle or chassis components with a current-carrying function for the actuators 10, 11.

Figure 1:
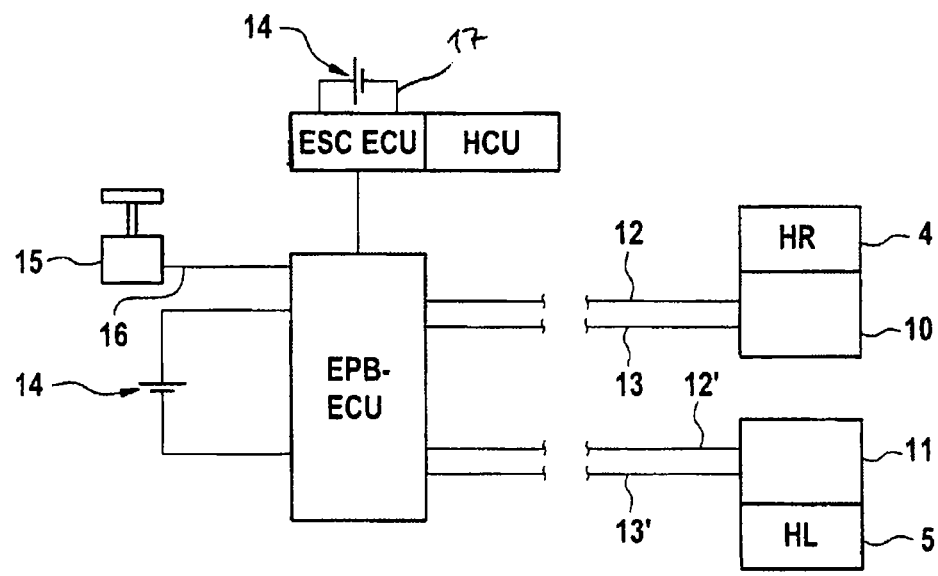
FIG. 1 shows a previously known brake system.
Figure 3:
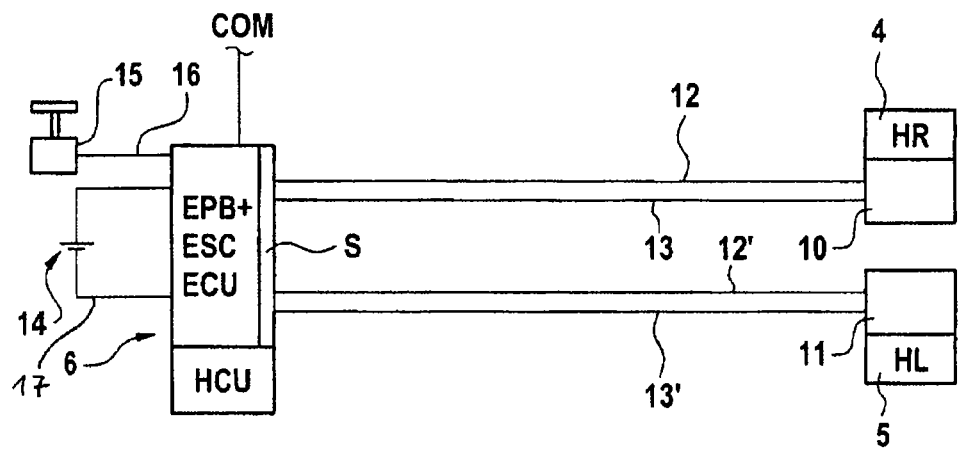
FIG. 3 shows details of the brake system shown in FIG. 2 for the purpose of comparison with the known system shown in FIG. 1.

The figures show the differences in the details of an inventive brake system as shown in FIGS. 2 and 3 in comparison with a previously known brake system as shown in FIG. 1.

For the operation of the brake system, the following functionality is additionally proposed. In principle, the electronics unit EPB+ESC-ECU stores at least one prescribed target current value which correlates to a prescribed tightening force for the electromechanical actuators 10, 11. In addition, the electronics unit EPB+ESC-ECU is used to measure or ascertain a maximum actual current, demanded by an electromechanical actuator 10, 11, whenever the parking brake is operated. In a subsequent method step, the maximum actual current is compared with the prescribed target current value, and in this way a possible tensioning force deficit is ascertained if the actual current is found to be smaller than the target current value. On this basis, the ECU is used to decide whether and to what extent the unit 6 performs an additional electrohydraulic supply of power.

The difference formed between the target current value and the maximum actual current value can, to some extent, be used as a parameter for quantizing a tensioning force difference in order to allow graduated or controlled startup of the unit 6 on the basis of this information. This allows the unit 6 to be started up on the basis of the parameter as required. In an additionally preferred embodiment of this function, provision may be made for the tensioning force deficit to be effected by output control by the unit 6 and/or by pressure regulation using electronically controllable electrohydraulic valves which are associated with the hydraulic actuators 2-5.

A release operation for the parking brake function is carried out generally without activating the motor pump unit 6, that is to say by means of reversed operation of the electromechanical actuator.

The invention claimed is:

1. A multi-circuit motor vehicle brake system for controlling hydraulic brakes, electric brakes and stability control of the motor vehicle, the multi-circuit system comprising:
    an integrated electronic brake force distribution unit including i) a hydraulic control unit for controlling the hydraulic brakes, and ii) an electronic control unit for controlling both the electric brakes and the stability control of the motor vehicle,
    wherein the integrated electronic brake force distribution unit controls a plurality of brake calipers with hydraulically operable actuators which are hydraulically connected to the hydraulic control unit comprising a motor pump unit for the hydraulic supply of power,
    wherein the hydraulically operable actuators are configured to be operated by hydraulic operating means under the initiation of a driver, and/or are configured to be operated by the integrated electronic brake force distribution unit independently of the driver,
    wherein at least some of the brake calipers additionally or separately have electromechanical actuators,
    wherein at least one electrical current source is electrically connected to the integrated electronic brake force distribution unit, which is configured for supplying electricity to the integrated electronic brake force distribution unit,
    wherein the integrated electronic brake force distribution unit is connected to the electromechanical actuators by at least two respective separate electrical supply lines, and wherein the integrated electronic brake force distribution unit has at least one electrical semi-conductor switch in order to supply electricity to the electromechanical actuators, wherein in response to an electromechanical brake of the vehicle being manually activated by the driver of the vehicle using a man-machine interface, the electronic control unit automatically performs the following steps;

measuring or ascertaining a maximum actual current that is demanded by the electromechanical actuators;

comparing the maximum actual current with a prescribed target current value in order to ascertain a tensioning force deficit of the electric brake; and activating the hydraulic control unit to control a hydraulic actuator to apply an additional tightening force to the hydraulic brakes to supplement the electromechanical actuators based on the tensioning force deficit that has been ascertained.

2. The multi-circuit motor vehicle brake system as claimed in claim 1, wherein the electrical switching means additionally has at least one integrated means for reversing the electromechanical actuators in order to release a parking brake function.

3. The multi-circuit motor vehicle brake system as claimed in claim 1, wherein each switching means is provided in a form integrated in the electronics unit and contains at least one semiconductor switch and/or a MOSFET bridge circuit.

4. The multi-circuit motor vehicle brake system as claimed in claim 1, wherein the electronic control unit has at least one additional electrical interface for the electrical connection to the electrical supply lines.

5. The multi-circuit motor vehicle brake system as claimed in claim 4, wherein the at least one additional electrical interface is an electrical plug-in element.

6. The multi-circuit motor vehicle brake system as claimed in claim 1, wherein the electronic control unit has an additional interface to a man-machine interface for operating or releasing a parking brake effect, so that the man-machine interface and the switching means are connected in series.

7. The multi-circuit motor vehicle brake system as claimed in claim 6, wherein the man-machine interface is a separate switch and/or pushbutton switch.

8. The multi-circuit motor vehicle brake system as claimed in claim 1, wherein the electronic control unit and the current source are arranged together in a common installation space.

9. The multi-circuit motor vehicle brake system as claimed in claim 8, wherein the common installation space is an engine compartment or trunk of a motor vehicle.

10. The multi-circuit motor vehicle brake system as claimed in claim 1, wherein a quotient for a length of a longest supply line, on the one hand, and a length of an electrical connection between the electrical current source and the electronic control unit, on the other hand, is at least approximately two or more.

11. The multi-circuit motor vehicle brake system as claimed in claim 10, wherein the quotient is between approximately 3 and 10.

12. The multi-circuit motor vehicle brake system as claimed in claim 1, wherein at least some of the brake calipers are configured for the purposes of operating or releasing a parking brake effect.

13. A method of operation for a vehicle brake system of a vehicle including an electromechanical brake and a hydraulic brake, the method comprising the steps of:

storing, by an electronic control unit, at least one prescribed target current value which correlates to a prescribed tightening force of the electromechanical brake;

wherein in response to the electromechanical brake of the vehicle being manually activated by a driver of the vehicle using a man-machine interface, the electronic control unit automatically performs the following steps:

measuring or ascertaining a maximum actual current that is demanded by an electromechanical actuator of the electromechanical brake;

comparing the maximum actual current with the prescribed target current value in order to ascertain a tensioning force deficit of the brake; and activating an electronically controlled unit to control a hydraulic actuator to apply an additional tightening force to the brake to supplement the electromechanical actuator based on the tensioning force deficit that has been ascertained.

14. The method of operation for a vehicle brake system as claimed in claim 13 further comprising the steps of:

forming a difference between the prescribed target current value and the maximum actual current value;

providing the difference as a parameter for quantizing a tensioning force deficit; and activating the electronically controlled unit on the basis of the parameter.

15. The method of operation for a vehicle brake system as claimed in claim 13 further comprising the step of reducing the tensioning force deficit by (i) output control by the electronically controlled unit, and/or (ii) pressure regulation using electronically controllable electrohydraulic valves in the electronically controlled unit.

16. The method of operation for a vehicle brake system as claimed in claim 13, wherein a release operation after a parking brake function, without hydraulic supply of power by the electronically controlled unit, is effected by reversed operation of the electromechanical actuator.

* * * * *

UNITED STATES PATENT AND TRADEMARK OFFICE
CERTIFICATE OF CORRECTION

PATENT NO.        : 8,645,039 B2         Page 1 of 1
APPLICATION NO.   : 12/989188
DATED             : February 4, 2014
INVENTOR(S)       : Schneider et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this

Twenty-ninth Day of September, 2015

Michelle K. Lee
*Director of the United States Patent and Trademark Office*